(12) United States Patent
Pandey et al.

(10) Patent No.: US 11,606,251 B2
(45) Date of Patent: Mar. 14, 2023

(54) DEPLOYING A SERVER STACK HAVING A CROSS-SERVER DEPENDENCY

(71) Applicant: Oracle International Corporation, Redwood Shores, CA (US)

(72) Inventors: Pradip Kumar Pandey, Parker, CO (US); Steven Mark Fillipi, Aurora, CO (US); Clayton Drew Seeley, Highlands Ranch, CO (US); Karthik M U, Bangalore (IN); Sanjeev Kumar Sharma, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 38 days.

(21) Appl. No.: 17/120,599

(22) Filed: Dec. 14, 2020

(65) Prior Publication Data
US 2021/0099342 A1 Apr. 1, 2021

Related U.S. Application Data

(60) Division of application No. 16/364,601, filed on Mar. 26, 2019, now Pat. No. 10,897,394, which is a
(Continued)

(51) Int. Cl.
*G06F 15/177* (2006.01)
*H04L 41/0813* (2022.01)
(Continued)

(52) U.S. Cl.
CPC .......... *H04L 41/0813* (2013.01); *H04L 43/50* (2013.01); *H04L 67/01* (2022.05); *H04L 67/10* (2013.01)

(58) Field of Classification Search
CPC ...... H04L 41/0813; H04L 43/50; H04L 67/10
See application file for complete search history.

(56) References Cited

U.S. PATENT DOCUMENTS 6,446,109 B2  9/2002  Gupta
6,944,653 B2  9/2005  Fong et al.
(Continued)

OTHER PUBLICATIONS

Deploying the IAM Suite with the Deployment Wizard-1, Oct. 28, 2016.
(Continued)

*Primary Examiner* — Hua Fan
(74) *Attorney, Agent, or Firm* — Invoke

(57) ABSTRACT

Techniques for deploying a server stack having a cross-server dependency are disclosed. A deployment engine initiates a deployment process for a server stack. The deployment engine provisions servers of one server type ("requisite servers"). The deployment engine attempts to provision servers of another server type ("dependent servers"). The deployment engine executes a test that requires the dependent servers to invoke a service executed by the requisite servers. Based on the test results, the deployment engine determines that an operational requirement of the dependent servers is not satisfied. The deployment engine modifies a configuration for the requisite servers to satisfy the operational requirement of the dependent servers. The deployment engine re-provisions the requisite servers using the modified configuration. The deployment engine completes the deployment process for the server stack.

20 Claims, 8 Drawing Sheets

Related U.S. Application Data continuation of application No. 15/598,692, filed on May 18, 2017, now Pat. No. 10,291,467.

(60) Provisional application No. 62/395,557, filed on Sep. 16, 2016.

(51) Int. Cl.
  *H04L 43/50* (2022.01)
  *H04L 67/10* (2022.01)
  *H04L 67/01* (2022.01)

(56) References Cited

U.S. PATENT DOCUMENTS

| | | |
|---|---|---|
| 7,441,021 B1 | 10/2008 | Perry |
| 7,590,739 B2 | 9/2009 | Swildens et al. |
| 8,060,542 B2 | 11/2011 | Shankar et al. |
| 8,341,619 B2 | 12/2012 | Pall et al. |
| 8,392,530 B1 | 3/2013 | Manapragada et al. |
| 8,484,716 B1 | 7/2013 | Hodgson et al. |
| 8,510,600 B2 | 8/2013 | Broda et al. |
| 9,112,813 B2 | 8/2015 | Jackson |
| 9,122,536 B2 | 9/2015 | Kelkar et al. |
| 9,256,473 B1* | 2/2016 | Volchegursky ........... G06F 8/61 |
| 9,654,442 B2 | 5/2017 | Tung |
| 10,291,467 B2 | 5/2019 | Pandey et al. |
| 2006/0008041 A1 | 1/2006 | Kim et al. |
| 2006/0123414 A1 | 6/2006 | Fors et al. |
| 2008/0222287 A1* | 9/2008 | Bahl ..................... H04L 41/12 |
| | | 709/224 |
| 2009/0199116 A1 | 8/2009 | Von et al. |
| 2014/0279201 A1 | 9/2014 | Iyoob et al. |
| 2017/0339013 A1 | 11/2017 | Allen |

OTHER PUBLICATIONS

HEAT Desktop & Server Management (DSM), Oct. 26, 2016.
HP CloudSystem: An integrated and open platform to build and manage cloud services, May 2012.

* cited by examiner

DEPLOYING A SERVER STACK HAVING A CROSS-SERVER DEPENDENCY

INCORPORATION BY REFERENCE; DISCLAIMER

Each of the following applications are hereby incorporated by reference: application Ser. No. 16/364,601, filed on Mar. 26, 2019; application Ser. No. 15/598,692, filed May 18, 2017; application No. 62/395,557, filed on Sep. 16, 2016. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to server stacks. In particular, the present disclosure relates to deploying a server stack having a cross-server dependency.

BACKGROUND

A multi-tier architecture (also referred to as a "multi-layered architecture) is used to implement a set of servers (also referred to as a "server stack") and/or other devices for executing various applications. Each tier is assigned a different role. One common structure is the three-tiered architecture, including the following ordered list of tiers: (a) presentation, (b) application, and (c) storage. As an example, a presentation tier may include a web browser that renders static and/or dynamic content; an application tier may include an engine using some dynamic Web content technology (such as ASP, CGI, ColdFusion, Dart, JSP/Java, Node.js, PHP, Python or Ruby on Rails); a storage tier may include a database. The web browser may generate a user interface, which is used to accept user input and present information to a user. Based on user input, the web browser may send requests to the application tier. The application tier may service the requests, which may include making queries and/or updates against the database.

Servers associated with the presentation tier may be referred to as "presentation servers." Servers associated with the application tier may be referred to as "application servers." Servers associated with the storage tier may be referred to as "storage servers."

Any number of tiers may be used in a multi-tier architecture. In some cases, the application layer may be further sub-divided into more fine-grained tiers. In some cases, an integration tier may be added as an additional tier. The integration tier may provide an interface (such as, an application programming interface (API)) for accessing data in the storage tier. The integration tier may be implemented between the application tier and the storage tier.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
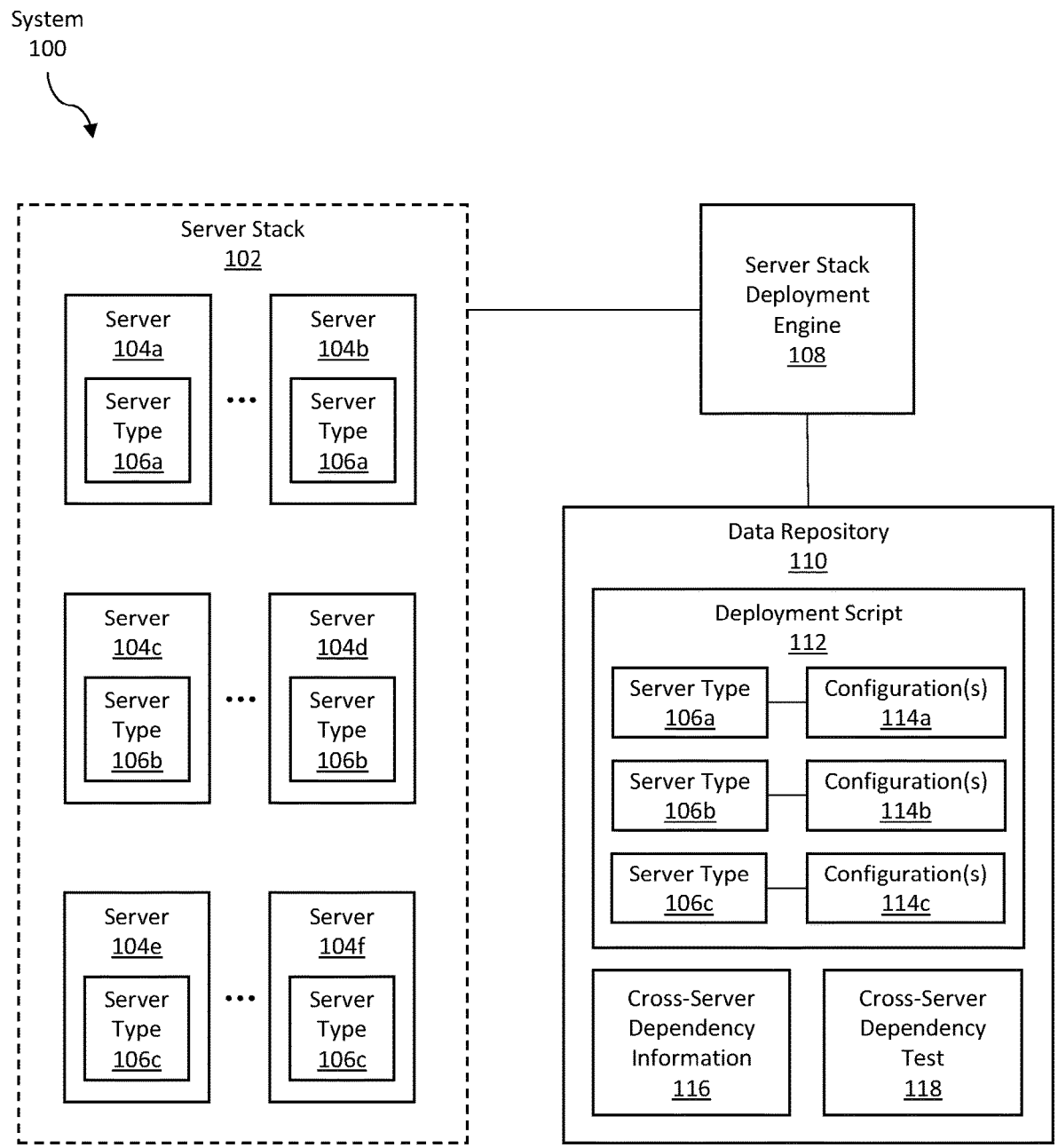
FIG. 1 illustrates a server stack deployment system, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SERVER STACK DEPLOYMENT SYSTEM ARCHITECTURE
3. DEPLOYING A SERVER STACK ASSOCIATED WITH A CROSS-SERVER DEPENDENCY
4. ADDING AND/OR REMOVING A SERVER FROM A DEPLOYED SERVER STACK ASSOCIATED WITH A CROSS-SERVER DEPENDENCY
5. DEPLOYING A SERVER STACK ASSOCIATED WITH A MUTUAL CROSS-SERVER DEPENDENCY
6. EXAMPLE EMBODIMENT
7. HARDWARE OVERVIEW
8. MISCELLANEOUS; EXTENSIONS

1. General Overview

In one or more embodiments, a server stack is associated with a cross-server dependency. A cross-server dependency is a dependency from a server of one server type on a server of another server type. Various types of dependency may exist. One type of dependency is a dependency between two servers that are associated with different tiers of a multi-tier architecture for a server stack. According to the multi-tier architecture, one server, associated with an application tier, invokes a service executed by another server, associated with a storage tier. The application server is said to "depend" on the storage server. Another type of dependency exists where one server needs information generated by another server, and/or one server is affected by information generated by another server. As an example, a storage server may encrypt a database based on a master key generated by an application server. The storage server is said to "depend" on the application server. In some cases, two servers mutually depend on each other. As an example, an application server may invoke a service of a storage server. Meanwhile, the storage server may encrypt a databased on a master key generated by the application server. This scenario may be referred to as a "mutual cross-server dependency."

One or more embodiments include deploying a server stack associated with a cross-server dependency. A server stack deployment engine (also referred to as a "deployment engine") initiates a deployment process for the server stack. The deployment process may be executed based on a script and/or a set of code. The deployment engine provisions servers of a particular server type using a particular configuration. Then, the deployment engine attempts to provision servers of another server type. The latter-provisioned servers may include functionality that invokes one or more services of the prior-provisioned servers. The latter-provisioned servers may be referred to as "dependent servers," and the prior-provisioned servers may be referred to as "requisite servers." The deployment engine executes a test on the dependent servers that requires the dependent servers to invoke a service executed by the requisite servers. The deployment engine determines whether the configuration of the requisite servers satisfy an operational requirement of the dependent servers. If the operational requirement is not satisfied, then the deployment engine modifies the particular configuration for the requisite servers to satisfy the operational requirements of the dependent servers. The deployment engine re-provisions the requisite servers using the modified configuration. Optionally, the deployment engine also re-provisions the dependent servers. The deployment engine provisions any remaining servers within the server stack. The deployment engine completes the deployment process for the server stack.

One or more embodiments include adding and/or removing a server of a particular server type in a deployed server stack. The server to be added and/or removed may be referred to as a "target server." A deployment engine determines whether the deployed server stack already includes a server of the particular server type. If the deployed server stack includes a server of the particular server type, then the deployment engine obtains cross-dependency information for the target server based on the existing servers in the deployed server stack. Otherwise, the deployment engine obtains cross-server information for the target server from a user and/or another application. The deployment engine determines a modified configuration for one or more of the following servers existing in the deployed server stack: a server that is depended upon by the target server, a server that is of the same server type as the target server, and/or a server that depends on the target server. The deployment engine determines a particular sequence for re-provisioning the servers whose configurations have been modified as well as adding and/or removing the target server. The deployment engine completes the addition and/or removal of the target server.

One or more embodiments include deploying a server stack associated with a mutual cross-server dependency. A deployment engine initiates a deployment process for a server stack. The deployment process may be executed based on a script and/or a set of code. The deployment engine provisions servers of a particular server type using a particular configuration. Then, the deployment engine provisions servers of another server type. The latter-provisioned servers may include functionality that invokes one or more services of the prior-provisioned servers. The latter-provisioned servers may be referred to as "dependent servers," and the prior-provisioned servers may be referred to as "requisite servers." During the provisioning of the dependent servers, the deployment engine determines a set of information that was not known prior to provisioning the dependent servers. The deployment engine determines whether the configuration for the requisite servers needs to be modified based on the set of information. If modification is needed, the deployment engine modifies the configuration for the requisite servers based on the set of information. The deployment engine re-provisions the requisite servers using the modified configuration. Optionally, the deployment engine re-provisions the dependent servers. The deployment engine provisions any remaining servers within the server stack. The deployment engine completes the deployment process for the server stack.

In one or more embodiments, a deployment engine performs a recursive testing and provisioning methodology for deploying a server stack associated with a cross-server dependency. The deployment engine recursively tests a dependent server that invokes a service of a requisite server, and re-provisions the requisite server using a modified configuration, until operational requirements of the dependent are satisfied. The recursion is performed based on instructions included in a deployment script and/or code. The deployment script is configured for deployment of inter-dependent components without the need for user input throughout the deployment process. The deployment script includes instructions and/or other information for determining a modified configuration for the requisite server.

In one or more embodiments, a deployment engine performs a back-tracking methodology for deploying a server stack associated with a mutual cross-server dependency. As the deployment engine provisions servers of a higher tier, in a multi-tier architecture, the deployment engine backtracks to previously-provisioned servers to determine whether a configuration of a previously-provisioned server needs to be modified. The deployment engine determines whether the previously-provisioned server needs and/or is affected by a set of information determined during provisioning of one or more latter-provisioned servers. The backtracking is performed based on instructions included in a deployment script and/or code. The deployment script is configured for deployment of inter-dependent components without the need for user input throughout the deployment process. The deployment script includes instructions and/or other information for determining a modified configuration for the previously-provisioned server.

One or more embodiments described in this Specification and/or recited in the claims may not be included in this General Overview section.

2. Server Stack Deployment System Architecture

FIG. 1 illustrates a server stack deployment system, in accordance with one or more embodiments. As illustrated in FIG. 1, system 100 includes a server stack 102, a server stack deployment engine 108, and a data repository 110. The server stack 102 includes servers of different server types, such as servers 104a-104b of server type 106a, servers 104c-d of server type 106b, and servers 104e-104f of server type 106c. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, a server (such as server 104a, server 104b, server 104c, server 104d, server 104e, or server 104f is a computing program and/or device that provides functionality for other computing programs and/or devices, called "clients." This architecture may be referred to as a "client-server model," wherein a single overall computation is distributed across multiple processes and/or devices. A server may provide various functionalities, called "services," such as sharing data or resources among multiple clients, or performing computations for a client. A client sends a request to the server, which performs some action and sends a response back to the client, typically with a result or acknowledgement.

A single server can serve multiple clients, and a single client can use multiple servers. A client process may run on the same device or may connect over a network to a server on a different device. A particular program and/or device may simultaneously be a server with respect to one program and/or device, while being a client with respect to another program and/or device. Examples of servers include web servers, application servers, and storage servers.

In one or more embodiments, a server stack 102 includes multiple sets of servers 104a-f, each set of servers serving a different role. This architecture may be referred to as a "multi-tier architecture." The servers 104a-f within a server stack 102 work together to execute one or more applications, such as a web application.

As illustrated, for example, a server stack 102 may include the following ordered list of tiers: (a) presentation, (b) application, and (c) storage. Server type 106a may be "presentation." Server type 106b may be "application." Server type 106c may be "storage." Servers 104a-b may be referred to as "presentation servers" or "web servers." Servers 104c-d may be referred to as "application servers." Servers 104e-f may be referred to as "storage servers" or "database servers."

A "higher" tier within a multi-tier architecture is a tier that is closer to the user interface. A "lower" tier within a multi-tier architecture is a tier that is farther away from the user interface. As an example, a three-tier architecture may be used to implement a web application. The presentation tier may be referred to as the "highest tier." The application tier may be referred to as the "middle tier." The storage tier may be referred to as the "lowest tier."

Servers that are within lower tiers may be referred to as "requisite servers" with respect to servers within higher tiers. Servers that are within higher tiers may be referred to as "dependent servers" with respect to servers within lower tiers. Referring to the example of the three-tier architecture above, servers within the application tier may be "dependent servers" with respect to servers within the storage tier. Additionally, servers within the application tier may be "requisite servers" with respect to servers within the presentation tier.

Within a particular server type, the servers may be associated with the same attributes and/or different attributes. For example, servers of a particular server type may be associated with different operating systems, and/or different hardware resources. The same configuration may apply to all servers within a particular server type. Alternatively, different configurations may apply to servers within a particular server type. For example, one configuration may apply to Windows servers of a particular server type, while another configuration may apply to Linux servers of the same server type.

In one or more embodiments, a data repository 110 is any type of storage unit and/or device (e.g., a file system, database, collection of tables, or any other storage mechanism) for storing data. Further, a data repository 110 may include multiple different storage units and/or devices. The multiple different storage units and/or devices may or may not be of the same type or located at the same physical site. Further, a data repository 110 may be implemented or may execute on the same computing system as a server stack deployment engine 108. Alternatively or additionally, a data repository 110 may be implemented or executed on a computing system separate from a server stack deployment engine 108. A data repository 110 may be communicatively coupled to a server stack deployment engine 108 via a direct connection or via a network.

Information describing a deployment script 112, cross-server dependency information 116, and a cross-server dependency test 118 may be implemented across any of components within the system 100. However, this information is illustrated within the data repository 110 for purposes of clarity and explanation.

In one or more embodiments, a deployment script 112 includes a set of computing instructions. The computing instructions may be interpreted into an intermediate computing language, and then translated into machine code. Additionally or alternatively, the computing instructions may be directly compiled into machine code, to be executed by a virtual machine and/or a physical machine.

A deployment script 112 includes instructions for provisioning a virtual and/or a physical server. Server provisioning is a set of actions to prepare a server with appropriate systems, data and software, and network configurations. Server provisioning instructions may, for example, include instructions for (a) selecting a server from a pool of servers; (b) selecting an image to install and/or run on the selected server; (c) installing and/or booting the image; (d) assigning and configuring resources (such as, Internal Protocol (IP) address(es), disk space, processors); (e) installing and configuring middleware; and/or (f) installing and configuring applications.

A deployment script 112 includes instructions for deploying a server stack 102. Server stack deployment is a set of actions for making a server stack 102 available to end users. Server stack deployment instructions may, for example, include instructions for (a) installing applications onto application servers; (b) configuring the applications' resources, such as databases and/or mainframes; and/or (c) configuring middleware components. The above instructions need to be properly sequenced in order for the server stack 102 to be successfully deployed. A proper sequence may include starting and/or restarting one or more operations. As an example, an application may not execute properly, if the application is installed and started before a data source for the application is configured.

In some cases, a deployment script 112 may additionally include instructions for configuring and customizing installed applications for different target environments. Examples of different environments include a development environment, a test environment, an acceptance environment, and a production environment. As an example, an application for a development environment needs data from a development database, whereas the same application for a test environment needs data from a test database.

A deployment script 112 includes a configuration for servers of a particular server type. The configuration specifies attributes and/or configuration data, such as:

(a) which servers to select, from a pool of servers, for configuring as servers of the particular type;
(b) the image to be installed and/or run on the servers;
(c) operations for installing and/or booting the image;
(d) the resources to assign to and configure for the servers, such as: the number of connections to be provided by the servers; which IP address(es) to use; the amount of disk memory space; the number of processors and/or CPUs; the interface, port, communication channel, and/or protocol for communicating with other servers;
(e) operations and/or processes to be executed for serving requests from servers of a certain server type;
(e) the middleware to be installed and/or configured; and/or
(f) the applications to be installed and/or configured.

As illustrated, for example, a deployment script 112 includes different configurations for different server types. Configuration 114a is applied to servers of server type 106a. Configuration 114b is applied to servers of server type 106b. Configuration 114c is applied to servers of server type 106c.

In an embodiment, a deployment script 112 includes all instructions to be executed for deploying a server stack 102. Alternatively, a deployment script 112 references other scripts and/or codes that include a subset of the instructions for deploying a server stack 102. Other scripts and/or codes may be saved in the same data repository 110 and/or a different data repository. The deployment script coordinates the execution of the referenced scripts and/or code. The deployment script 112 specifies and/or determines a particular sequence for executing the other scripts. Whether the deployment script 112 includes all instructions for deploying a server stack or references other scripts, the deployment script 112 manages the entire deployment process for the entire server stack 102.

In one or more embodiments, cross-server dependency information 116 includes information regarding dependencies between servers of different server types within a server stack 102. As an example, a cross-server dependency may involve a server of one server type invoking a service executed by a server of another type. As another example, a cross-server dependency may involve a server of one server type encrypting data based on a key generated by a server of another server type. As another example, a cross-server dependency may involve a server of one server type that determines a port, communication channel, and/or protocol with which to communicate with a server of another server type, based on a configuration of the server of the other type. Additionally or alternatively, cross-server dependency information 116 includes information regarding mutual cross-server dependencies. A mutual cross-server dependency exists when two servers mutually depend on each other. As an example, an application server may invoke a service executed by a storage server. Meanwhile, the storage server may encrypt a database based on a master key generated by the application server. The application server and the storage server may be referred to as having a "mutual cross-server dependency."

Cross-server dependency information 116 includes information on direct cross-server dependencies and/or indirect cross-server dependencies. Referring to FIG. 1, for example, server 104a, of server type 106a, may invoke a particular service of server 104c, of server type 106b. Execution of the particular service, by server 104c, may invoke another service of server 104e, of server type 106c. In this example, server 104a may be referred to as having a direct cross-server dependency on server 104c. Server 104a may be referred to as having an indirect cross-server dependency on server 104e.

Cross-server dependency information 116 may be obtained based on user input and/or another application. Additionally or alternatively, cross-server dependency information 116 may be determined and/or learned by monitoring the operations and/or communications of the server stack 102.

In one or more embodiments, a cross-server dependency test 118 includes a set of computing instructions to be executed on a particular server of a server stack 102. The particular server, executing the cross-server dependency test 118, invokes one or more services of a server of another server type. The cross-server dependency test 118 determines whether an operational requirement of the particular server is satisfied by the configuration of the other server. Referring to FIG. 1, for example, server 104c may execute a cross-server dependency test. The cross-server dependency test may include instructions for executing a human resources application on server 104c. The cross-server dependency test may include instructions for creating a new employee record within the human resources application. Creation of a new employee record may require server 104c to invoke a database service executed on server 104e. The cross-server dependency test may determine whether an operational requirement of server 104c is satisfied by a configuration of server 104e.

In an embodiment, the cross-server dependency test 118 (and/or another portion of the deployment script) includes a set of mappings between (a) one or more behaviors of the dependent server, the requisite server, and/or the network between the dependent server and the requisite server and (b) configuration data that is required of the requisite server. For example, a behavior of a requisite server may be: generation of an error message indicating that the requisite server is unable to interpret and/or parse an incoming request from a dependent server. A set of mappings may map this behavior to a particular set of configuration data for the dependent server. In particular, this behavior may correspond to configuring the requisite server to use a particular interface, such as a TCP/IP interface. The configuration for the requisite server needs to be modified to use the TCP/IP interface.

In an embodiment, the cross-server dependency test 118 (and/or another portion of the deployment script) includes a set of mappings between (a) one or more behaviors of the dependent server, the requisite server, and/or the network between the dependent server and the requisite server and (b) one or more operational requirements of the dependent server that have not been satisfied based on the corresponding behaviors. For example, a behavior of a requisite server may be: generation of an error message indicating that the requisite server is unable to interpret and/or parse an incoming request from a dependent server. A set of mappings may map this behavior to a particular operational requirement of the dependent server. In particular, this behavior may correspond to the dependent server requiring a particular interface to be implemented by the requisite server. The particular interface is able to interpret and/or parse the request of the dependent server. If the requisite server does not implement the particular interface, then the requisite server is unable to interpret and/or parse the request.

Examples of operational requirements of a server (a "dependent server") that invokes a service of another server (a "requisite server") include:
(a) a minimum number of connections provided by the requisite server that are configured to communicate with the dependent server;

(b) a minimum number of central processing units (CPUs) provided by the requisite server that are configured to serve requests from the dependent server;

(c) a minimum size of disk memory space provided by the requisite server that are configured to store information associated with the dependent server;

(d) a particular interface, port, communication channel, or protocol that must be used by the requisite server for communicating with the dependent server; and (e) a particular operation that must be executed by the requisite server for serving requests from the dependent server.

In one or more embodiments, a server stack deployment engine 108 refers to hardware and/or software configured to perform operations described herein for deploying a server stack associated with a cross-server dependency; adding and/or removing a server of a particular server type in a deployed server stack; and/or deploying a server stack associated with a mutual cross-server dependency. Examples of operations for deploying a server stack associated with a cross-server dependency are described below with reference to FIG. 2. Examples of operations for adding and/or removing a server of a particular server type in a deployed server stack are described below with reference to FIG. 3. Examples of operations for deploying a server stack associated with a mutual cross-server dependency are described below with reference to FIG. 4.

In an embodiment, a server stack deployment engine 108 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, a personal digital assistant (PDA).

3. Deploying a Server Stack Associated with a Cross-Server Dependency

Figure 2:
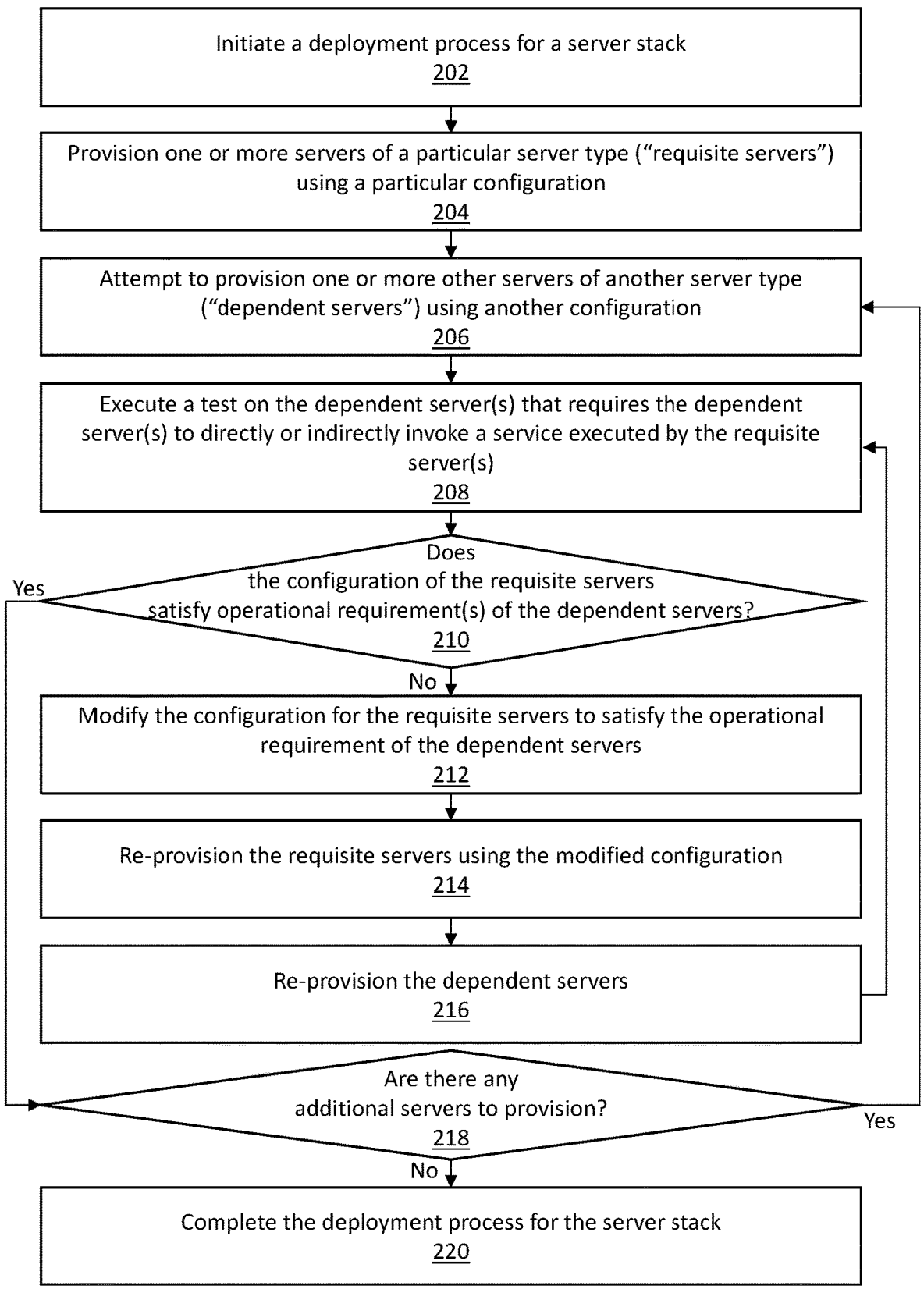
FIG. 2 illustrates an example set of operations for deploying a server stack associated with a cross-server dependency, in accordance with one or more embodiments.

FIG. 2 illustrates an example set of operations for deploying a server stack associated with a cross-server dependency, in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

One or more embodiments include initiating a deployment process for a server stack (Operation 202). A server stack deployment engine 108 initiates a deployment process for a server stack. The server stack deployment engine 108 obtains a deployment script. The deployment script may be obtained from a user and/or another application.

The server stack deployment engine 108 determines whether the deployment script references any other scripts and/or codes. The server stack deployment engine 108 loads the deployment script as well as any referenced scripts and/or codes. The server stack deployment engine 108 begins executing the deployment script.

One or more embodiments include provisioning one or more servers of a particular server type using a particular configuration (Operation 204). In an embodiment, the server stack being deployed implements a multi-tier architecture of servers. The servers of the particular server type, being provisioned at Operation 204, are associated with a lower tier than the servers of another server type, to be provisioned at Operation 206. Additionally or alternatively, the servers provisioned at Operation 206 may directly or indirectly invoke a service executed by the servers provisioned at Operation 204. Hence, the servers provisioned at Operation 204 may be referred to as "requisite servers," while the servers provisioned at Operation 206 may be referred to as "dependent servers."

The server stack deployment engine 108 determines a particular configuration for servers of a particular server type (also referred to as "requisite servers") based on the deployment script. The particular configuration may specify various configuration data for the requisite servers. The server stack deployment engine 108 provisions the requisite servers using the particular configuration, as described in the examples below.

The particular configuration for servers of the particular type may specify which servers to select, from a pool of servers, for configuring as servers of the particular type. Based on the particular configuration, the server stack deployment engine 108 selects the specified servers from the pool of servers. The server stack deployment engine 108 begins to provision the selected servers as the requisite servers.

The particular configuration for servers of the particular type may specify the image to be installed and/or run on the servers. Additionally or alternatively, the particular configuration may specify operations for installing and/or booting the image. Based on the particular configuration, the server stack deployment engine 108 installs and/or runs the specified image on the selected servers.

The particular configuration for servers of the particular type may specify the resources to assign to and configure for the servers, such as: the number of connections to be provided by the servers; which IP address(es) to use; the amount of disk memory space; the number of processors and/or CPUs; the interface, port, communication channel, and/or protocol for communicating with other servers. Based on the particular configuration, the server stack deployment engine 108 assigns and configures the resources for the servers.

The particular configuration for severs of the particular type may specify operations and/or processes to be executed for serving requests from servers of a certain server type. Based on the particular configuration, the server stack deployment engine 108 configures the servers to execute the specified operations and/or processes for requests from servers of the certain server type.

The particular configuration for servers of the particular type may specify the middleware to be installed and/or configured. Additionally and/or alternatively, the particular configuration may specify the applications to be installed and/or configured. Based on the particular configuration, the server stack deployment engine 108 installs and/or configures the middleware and/or the applications.

After configuring the requisite servers, the server stack deployment engine 108 optionally executes a test on the requisite servers to verify that the requisite servers have been successfully provisioned. The test may be used to determine whether the particular configuration has been properly applied to the requisite servers. Additionally, if there are servers on a lower tier, of the multi-tier architecture, than that of the requisite servers, then the test may verify whether the operational requirements of the requisite servers are satisfied by the configurations of the servers of the lower tiers. If the test determines that there is an error on the requisite servers, then the server stack deployment engine 108 re-provisions the requisite servers. If there are no errors, then the server stack deployment engine 108 begins to provision the dependent servers at Operation 206.

One or more embodiments include attempting to provision one or more servers of another server type using another configuration (Operation 206). The server stack deployment engine 108 determines another configuration for servers of another server type (also referred to as "dependent servers") based on the deployment script. Examples of operations for provisioning servers using a configuration are described above with reference to Operation 204.

One or more embodiments include executing a test on the dependent servers that requires the dependent servers to directly or indirectly invoke a service executed by the requisite servers (Operation 208). The server stack deployment engine 108 determines that the deployment script includes a test for the dependent servers. The test requires the dependent servers to directly or indirectly invoke a service executed by the requisite servers. Various types of tests may be used, as described in the examples below.

As an example, a deployment engine may provision a set of storage servers ("requisite servers"). Then, the deployment engine may attempt to provision a set of application servers ("dependent servers"). After configuring the application servers, the deployment engine may determine that the deployment script includes a test for the application servers. The deployment engine may execute the test on the application servers. Based on the execution of the test, the application servers may transmit a request to perform a particular service executed by the storage servers. The application servers may, for example, request that the storage servers make an update to a particular data record. If the update is completed, then the storage servers may transmit an acknowledgement to the application servers. The deployment engine may determine whether the application servers have received the acknowledgement from the storage servers.

As another example, a deployment engine may provision a set of storage servers ("requisite servers"). Then, the deployment engine may attempt to provision a set of application servers ("dependent servers"). After configuring the application servers, the deployment engine may determine that the deployment script includes a stress test and/or load test for the application servers. The test may specify a particular number of requests to be concurrently transmitted from the application servers to the storage servers. The particular number of requests is a targeted maximum number of requests that are to be served by the application executing on the server stack.

The deployment engine may execute the stress test and/or load test on the application servers. Based on the execution of the test, the application servers may concurrently transmit the particular number of requests to perform a particular service executed by the storage servers. The application servers may, for example, transmit one-thousand requests to the storage servers, requesting updates to various data records. If the updates are completed, then the storage servers may transmit acknowledgements to the application servers. The deployment engine may determine whether the application servers have received the acknowledgements from the storage servers.

As another example, a deployment engine may provision a set of storage servers ("requisite servers"). Then, the deployment engine may attempt to provision a set of application servers ("dependent servers"). After configuring the application servers, the deployment engine may determine that the deployment script includes an interface test for the application servers. The test may specify a particular interface (and/or port, protocol, or similar communications configuration data) to be used for communications between the application servers and the storage servers.

The deployment engine may execute the interface test on the application servers. Based on the execution of the test, the application servers may transmit, via the particular interface, a request to perform a particular service executed by the storage servers. The application servers may, for example, transmit the request over an HTTP interface, requesting that the storage servers make an update to a particular data record. If the update is completed, then the storage servers may transmit an acknowledgement to the application servers. The deployment engine may determine whether the application servers have received the acknowledgement from the storage servers.

As another example, a deployment engine may provision a set of storage servers ("requisite servers"). Then, the deployment engine may attempt to provision a set of application servers ("dependent servers"). After configuring the application servers, the deployment engine may determine that the deployment script includes a test to be executed on the application servers, which tests the execution of a particular operation on the storage servers.

The deployment engine may execute the test on the application servers. Based on the execution of the test, the application servers may transmit to the storage servers a request to perform the particular operation. The application servers may, for example, request that the storage servers authenticate the identity of a user prior to returning a particular data record to the user. The storage servers may perform authentication of the user. If the user is authenticated, then the storage servers may transmit the particular data record to the application servers. The deployment engine may determine whether the storage servers properly executed the authentication operations. For example, the deployment engine may determine whether any error messages are generated during execution of the authentication operations.

One or more embodiments include determining whether the configuration of the requisite servers satisfy one or more operational requirements of the dependent servers (Operation 210). As described above with reference to Operation 208, the server stack deployment engine 108 determines that the deployment script includes a test for the dependent servers. As described above with reference to the cross-server dependency test 118 of FIG. 1, the test includes a set of mappings between (a) one or more behaviors of the dependent server, the requisite server, and/or the network between the dependent server and the requisite server and (b) one or more operational requirements of the dependent server that have not been satisfied based on the corresponding behaviors.

Based on the execution of the test, the server stack deployment engine 108 monitors the behaviors of the dependent servers, requisite servers, and/or networks and connections between the dependent servers and the requisite servers. The server stack deployment engine 108 determines whether expected requests, responses, and/or acknowledgements are transmitted between the dependent servers and the requisite servers. The server stack deployment engine 108 determines whether any error messages are generated by the dependent servers, requisite servers, and/or other network devices.

Using the behaviors that are detected, the server stack deployment engine 108 performs a lookup of the set of mappings, specified by the test, between (a) the behaviors and (b) the operational requirements. The server stack deployment engine 108 determines one or more operational requirements of the dependent servers that are not satisfied by the configuration of the requisite servers that correspond to the detected behaviors.

As an example, a deployment engine may execute a stress test on a presentation server (the "dependent server") that requires the presentation server to successively transmit multiple requests an application server (the "requisite server"). The requests may be various requests for the application server to perform various computations based on input data included in the requests. The request may be stored in a queue (and/or another data structure). The application server may obtain the request from the queue.

The queue may become full. The presentation server may transmit another request. A "queue overflow" error message may be generated. The deployment engine may perform a lookup of a set of mappings between (a) one or more behaviors of the dependent server, requisite server, and/or network and (b) one or more operational requirements of the dependent server that have not been satisfied based on the corresponding behaviors. Based on the mappings, the deployment engine may determine that the "queue overflow" error message corresponds to the application servers having an insufficient number of CPUs to satisfy an operational requirement of the presentation server. The deployment engine may determine that the number of CPUs provided by the application server to service the requests of the presentation server is insufficient.

Continuing the example, the deployment engine may also monitor the rate at which the queue of requests grows. Based on the rate, the set of mappings may indicate a particular number of CPUs that are additionally required in order to satisfy the operational requirements of the presentation server.

As an example, a deployment engine may execute a stress test on a set of presentation servers ("dependent servers") that requires the presentation servers to transmit multiple requests a set of application servers ("requisite servers"). The requests may be various requests for the application servers to perform various computations based on input data included in the requests. The presentation servers may attempt to establish multiple connections with the application servers to transmit the requests. Each connection may require a certificate (such as, a security certificate, an SSL certificate, and/or a digital signature).

One of the presentation servers may be unable to establish a connection with one of the application servers. An "unable to establish connection" error message may be generated. The deployment engine may perform a lookup of a set of mappings between (a) one or more behaviors of the dependent server, requisite server, and/or network and (b) one or more operational requirements of the dependent server that have not been satisfied based on the corresponding behaviors. Based on the mappings, the deployment engine may determine that the "unable to establish connection" error message corresponds to the application servers having an insufficient number of connections to satisfy an operational requirement of the presentation servers. The deployment engine may determine that the number of connections provided by the application servers to service the requests of the presentation servers is insufficient.

One or more embodiments include modifying the configuration for the requisite servers to satisfy the operational requirement of the dependent servers (Operation 212). The server stack deployment engine 108 determines a modification for the configuration for requisite servers. The server stack deployment engine 108 modifies the configuration in an attempt to satisfy the operational requirement that was previously not satisfied at Operation 210.

As an example, a deployment engine may execute a test on a set of application servers that requires the application servers to invoke a service of a set of storage servers. The storage servers may be configured with a disk memory size of 100 GB. Based on the test, the deployment engine may determine that an operational requirement of the application servers may be 500 GB of disk memory size on the storage servers. The deployment engine may modify the configuration for the storage servers such that the storage servers provide a disk memory size of 500 GB.

As another example, a deployment engine may execute a test on a set of application servers that requires the application servers to invoke a service of a set of storage servers. The storage servers may be configured with a disk memory size of 100 GB. Based on the test, the deployment engine may determine that the storage servers have an insufficient disk memory size to satisfy an operational requirement of the application servers. The deployment engine may modify the configuration for the storage servers to increase the disk memory size by a gradual amount, such as 20 GB. The deployment engine may determine a modified configuration, specifying a disk memory size of 120 GB, for the storage servers. The deployment engine may re-provision the storage servers using 120 GB of disk memory. The deployment may iteratively test the application servers, determine whether there is sufficient disk memory on the storage servers, and gradually increase the disk memory by 20 GB, until the operational requirement of the application servers is satisfied. An example of the iterative process of testing and modifying the configuration is illustrated, in FIG. 2, as the loop in the flowchart from Operation 208 to Operation 216, returning back to Operation 208. The iterative process is further described below with reference to Operation 216.

In an embodiment, the configuration for the requisite servers include various attributes and/or configuration data. The configuration may specify, for example, a number of CPUs to be provided by the requisite servers, a number of connections to be provided by the requisite servers, and/or a disk memory size to be provided by the requisite servers. The server stack deployment engine 108 may modify a subset of the configuration data, without modifying another subset of the configuration data. For example, a deployment engine may modify the number of CPUs without modifying the number of connections provided by the requisite servers.

One or more embodiments include re-provisioning the requisite servers using the modified configuration (Operation 214). The server stack deployment engine 108 re-provisions the requisite servers using the modified configuration determined at Operation 212. Examples of operations for provisioning servers using a configuration are described above with reference to Operation 204. The server stack deployment engine 108 may execute all or only a subset of the operations described at Operation 204 to re-provision the requisite servers.

As an example, a deployment engine may provision a set of requisite servers. The provisioning of the requisite servers includes both a hardware booting on the requisite servers and a software installation on the requisite servers. Responsive to determining that an operational requirement of a set of dependent servers is not satisfied, the deployment engine may determine a modified configuration for the requisite servers. The modified configuration may affect only software components of the requisite servers. The deployment engine re-provisions the requisite servers by performing software installations on the requisite servers, without performing hardware booting on the requisite servers.

One or more embodiments include re-provisioning the dependent servers (Operation 216). The server stack deployment engine 108 makes another attempt to provision the dependent servers. The server stack deployment engine 108 may use the same configuration that was previously used at Operation 206. Alternatively, the server stack deployment engine 108 may use a different configuration. Examples of operations for provisioning servers using a configuration are described above with reference to Operation 204. The server stack deployment engine 108 may execute all or only a subset of the operations described at Operation 204 to re-provision the dependent servers.

After the dependent servers are configured, the server stack deployment engine 108 optionally executes a test on the dependent servers, as described above with reference to Operation 208. The test requires the dependent servers to invoke a service executed by the requisite servers. As illustrated, the server stack deployment engine 108 iteratively tests the dependent servers, determines whether operational requirements of the dependent servers are satisfied, and modifies the configuration for the requisite servers, until the operational requirements of the dependent servers are satisfied. The server stack deployment engine 108 may use the same test or different tests during each iteration.

One or more embodiments include determining whether there are any additional servers to provision for the server stack (Operation 218). The server stack deployment engine 108 determines whether the deployment script includes instructions for provisioning additional servers. If there are additional servers to provision, then the server stack deployment engine attempts to provision the additional servers, as described above with reference to Operation 206. The additional servers are now referred to as the "dependent servers," and previously-provisioned servers may be referred to as the "requisite servers." As illustrated, the server stack deployment engine 108 iterates the process until there are no additional servers to provision.

One or more embodiments include completing the deployment process for the server stack (Operation 220). The server stack deployment engine 108 completes the deployment process that was initiated at Operation 202. The server stack becomes available for use by one or more end users. End users may utilize the applications (such as, web applications) being implemented by the server stack.

In an embodiment, the server stack deployment engine 108 performs the entire deployment process for the entire server stack based on a single deployment script (also referred to as a "master script"). The single deployment script may include all instructions for deploying the server stack. Alternatively, the single deployment script may reference other scripts and/or code, each of which includes a subset of the instructions for deploying the server stack. Once the server stack deployment engine 108 loads the deployment script and begins execution of the deployment script, no human intervention is required until the deployment process for the entire server stack is complete. As an example, there is no need for a developer to initiate the provisioning of servers of different server types. There is no need for a developer to initiate a test on servers of a particular server type. There is no need for a developer to modify a configuration for servers of a particular server type. The deployment engine performs these operations based on the deployment script, without the need for human intervention.

Figure 3:
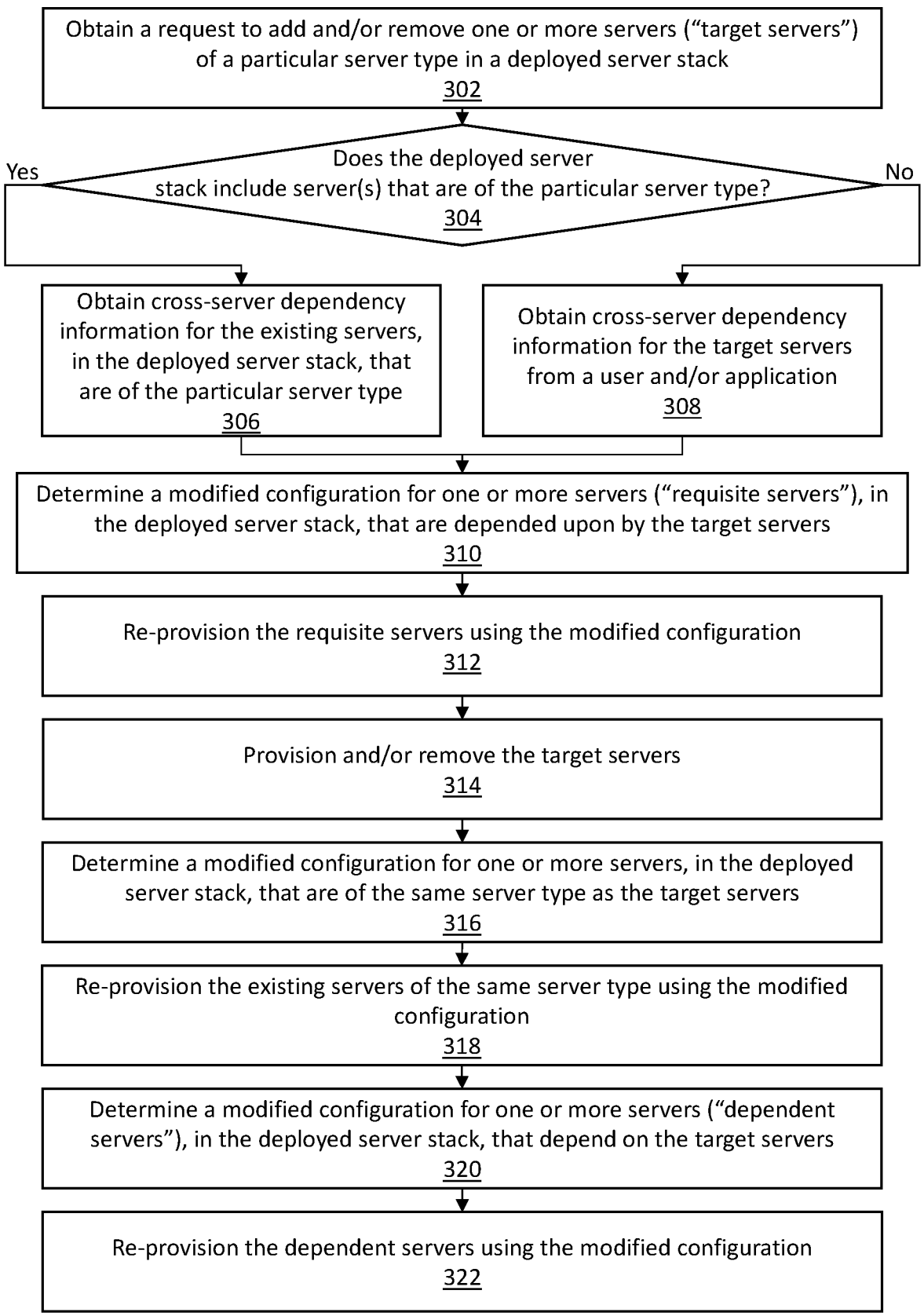
FIG. 3 illustrates an example set of operations for adding and/or removing a server from a deployed server stack associated with a cross-server dependency, in accordance with one or more embodiments.

4. Adding and/or Removing a Server from a Deployed Server Stack Associated with a Cross-Server Dependency FIG. 3 illustrates an example set of operations for adding and/or removing a server of a particular server type in a deployed server stack, in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

One or more embodiments include obtaining a request to add and/or remove one or more servers of a particular server type in a deployed server stack (Operation 302). A server stack deployment engine 108 may obtain a request to add servers to the deployed server stack. Additionally or alternatively, the server stack deployment engine 108 may obtain a request to remove servers from the deployed server stack. The servers to be added and/or removed may be referred to as "target servers." The server stack deployment engine 108 may obtain the request from a user and/or another application.

One or more embodiments include determining whether the deployed server stack includes any servers of the particular server type, which is specified by the request (Operation 304). The server stack deployment engine 108 determines whether the deployed server stack includes any servers of the particular server type. As an example, a deployment engine may obtain a request to add servers associated with the "application tier" in a multi-tier architecture. The deployment engine determines whether a deployed server stack already includes servers in the application tier.

If the deployed server stack includes the servers of the particular type, then the server stack deployment engine 108 obtains cross-server dependency information for the existing servers of the particular server type (Operation 306). The existing servers are already in the deployed server stack. As described above with reference to cross-server dependency information 116 in FIG. 1, cross-server dependency information may be obtained based on user input and/or another application. Additionally or alternatively, cross-server dependency may be determined and/or learned from monitoring the operations and/or communications of the deployed server stack. The server stack deployment engine 108 determines that the cross-server dependency information for the target servers is the same as the cross-server dependency information for the existing servers of the particular server type.

If the deployed server stack does not include the servers of the particular type, then the server stack deployment engine 108 obtains cross-server dependency information for the target servers from a user and/or another application (Operation 308).

One or more embodiments include determining a modified configuration for one or more servers ("requisite servers"), in the deployed server stack, that are depended upon by the target servers (Operation 310). Based on the cross-server dependency information for the target servers, the requisite servers are associated with a lower tier, in the multi-tier architecture, than the target servers. The server stack deployment engine 108 determines the modifications that are necessary for the requisite servers to be properly configured for the addition and/or removal of the target servers.

As an example, a configuration for a set of application servers ("requisite servers") may specify that the application servers are to serve requests from a set of ten presentation servers. The configuration may specify the identity of the ten presentation servers. The application servers may be configured to verify the identity of a server that transmits a request to the application servers, against the servers specified by the configuration, prior to serving the request.

A deployment engine may receive a request to add five additional presentation servers. Based on cross-server dependency information, the deployment engine may determine that the application servers are requisite servers with respect to the additional presentation servers. The deployment engine may determine a modified configuration for the application servers. The modified configuration may specify that the application servers are to serve requests from a set of fifteen presentation servers. The modified configuration may specify the identity of the fifteen presentation servers, including the ten original presentation servers and the five additional presentation servers.

As another example, a configuration for a set of application servers ("requisite servers") may specify that the application servers are to serve requests from a set of ten presentation servers. The configuration may specify that a maximum of ten connections may be established between the application servers and presentation servers.

A deployment engine may receive a request to add five additional presentation servers. Based on cross-server dependency information, the deployment engine may determine that the application servers are requisite servers with respect to the additional presentation servers. The deployment engine may determine that the existing configuration provides one connection per presentation server. The deployment engine may determine a modified configuration for the application servers. To maintain the same ratio of connections to presentation servers, the modified configuration may increase the maximum number of connections, between the application servers and the presentation servers, from ten to fifteen.

As another example, a configuration for a set of five application servers ("requisite servers") may specify that the application servers are to serve requests from a set of ten presentation servers. The configuration may specify that each application server is to provide ten CPUs for serving requests from the ten presentation servers.

A deployment engine may receive a request to remove two of the ten presentation servers. Based on cross-server dependency information, the deployment engine may determine that the application servers are requisite servers with respect to the presentation servers. The deployment engine may determine that the existing configuration provides a total of fifty CPUs (five application servers multiplied by ten CPUs per application server) for serving requests from ten presentation servers. The deployment engine may determine a modified configuration for the application servers. To maintain the same ratio of CPUs to presentation servers, a total of forty CPUs may be needed. Since there are five application servers, the modified configuration may specify that each application server is to provide eight CPUs for serving requests from the eight remaining presentation servers.

One or more embodiments include re-provisioning the requisite servers using the modified configuration determined at Operation 310 (Operation 312). Examples of operations for provisioning servers using a configuration are described above with reference to Operation 204. The server stack deployment engine 108 may execute all or only a subset of the operations described at Operation 204 to re-provision the requisite servers.

One or more embodiments include provisioning and/or removing the target servers (Operation 314).

If the request obtained at Operation 302 includes adding target servers, then the server stack deployment engine 108 provisions the target servers. If there are existing servers, in the deployed server stack, of the same server type as the target servers, the server stack deployment engine 108 may apply the configuration of the existing servers to the target servers. Alternatively, the request to add the target servers may specify a configuration for the target servers. The server stack deployment engine 108 may apply the specified configuration to the target servers. Examples of operations for provisioning servers using a configuration are described above with reference to Operation 204.

If the request obtained at Operation 302 includes removing target servers, then the server stack deployment engine 108 removes the target servers from the deployed server stack. The server stack deployment engine 108 may shut down or disable the target servers. The server stack deployment engine 108 may remove connections to the target servers.

One or more embodiments include determining a modified configuration for one or more servers, in the deployed server stack, that are of the same server type as the target servers (Operation 316). The server stack deployment engine 108 determines the modifications that are necessary for the existing servers, of the same server type, to be properly configured for the addition and/or removal of the target servers.

As an example, a configuration for a set of ten presentation servers may indicate that the ten presentation servers are to serve requests of all request types. Examples of request types include interactive workload, batch workload, and integration workload. A deployment engine may receive a request to add five additional presentation servers. The request may specify that the five additional presentation servers are to serve only requests of a single request type, such as, requests of an interactive workload.

The deployment engine may determine a modified configuration for the existing presentation servers. The deployment engine may determine an average number of requests, of each request type, which were received by the existing presentation servers over a historical time period. The deployment engine may determine that the five additional presentation servers adequately serve the average number of requests of the interactive workload. The deployment engine may determine that the ten original presentation servers need to serve requests of all other request types, based on the average number of requests of the other request types. The modified configuration, for the existing presentation servers, may specify that the existing presentation servers are to serve requests of the batch workload and requests of the integration workload, but not requests of the interactive workload.

One or more embodiments include re-provisioning the existing servers of the same server type using the modified configuration determined at Operation 316 (Operation 318). Examples of operations for provisioning servers using a configuration are described above with reference to Operation 204. The server stack deployment engine 108 may execute all or only a subset of the operations described at Operation 204 to re-provision the existing servers of the same server type.

One or more embodiments include determining a modified configuration for one or more servers ("dependent servers"), in the deployed server stack, that depended on the target servers (Operation 320). Based on the cross-server dependency information for the target servers, the dependent servers are associated with a higher tier, in the multi-tier architecture, than the target servers. The server stack deployment engine 108 determines the modifications that are necessary for the dependent servers to be properly configured for the addition and/or removal of the target servers.

As an example, a configuration for a set of presentation servers ("dependent servers") may specify that the presentation servers are to transmit requests to a set of twenty application servers. The presentation servers may be configured to transmit the requests to the application servers according to a round-robin scheme. The round-robin scheme may specify an ordered list of the twenty application servers. The first request, from the presentation servers, is transmitted to the first application server in the ordered list. The next request, from the presentation servers, is transmitted to the next application server in the ordered list. When the last application server in the ordered list is reached, the next request from the presentation servers is transmitted to the first application server in the ordered list.

A deployment engine may receive a request to add five additional application servers. Based on cross-server dependency information, the deployment engine may determine that the presentation servers are dependent servers with respect to the additional application servers. The deployment engine may determine a modified configuration for the presentation servers. The modified configuration may specify that the presentation servers are to transmit requests to a set of twenty-five application servers, including the twenty original application servers and the five additional application servers. The twenty-five application servers are included in the round-robin scheme.

As another example, a configuration for a set of ten presentation servers ("dependent servers") may specify that the presentation servers are to transmit requests to a set of twenty application servers. The configuration may specify that a maximum of fifty connections may be established between the presentation servers and the application servers.

A deployment engine may receive a request to remove five of the twenty application servers. Based on cross-server dependency information, the deployment engine may determine that the presentation servers are dependent servers with respect to the application servers. Since there is a decrease in the number of application servers, the deployment engine may determine a modified configuration that decreases the maximum number of connections between the presentation servers and the application servers. The deployment engine may decrease the maximum number of connections by a particular amount, such as five. The modified configuration, for the presentation servers, may specify that a maximum of forty-five connections may be established between the presentation servers and the application servers.

The deployment engine may test whether forty-five connections is adequate for satisfying operational requirements of the presentation servers and/or application servers. If not, the deployment engine may again modify the configuration for the presentation servers to increase the maximum number of connections. The modified configuration, for the presentation servers, may specify that a maximum of forty-seven connections may be established between the presentation servers and the application servers.

One or more embodiments include re-provisioning the dependent servers using the modified configuration determined at Operation 320 (Operation 322). Examples of operations for provisioning servers using a configuration are described above with reference to Operation 204. The server stack deployment engine 108 may execute all or only a subset of the operations described at Operation 204 to re-provision the dependent servers.

Figure 4:
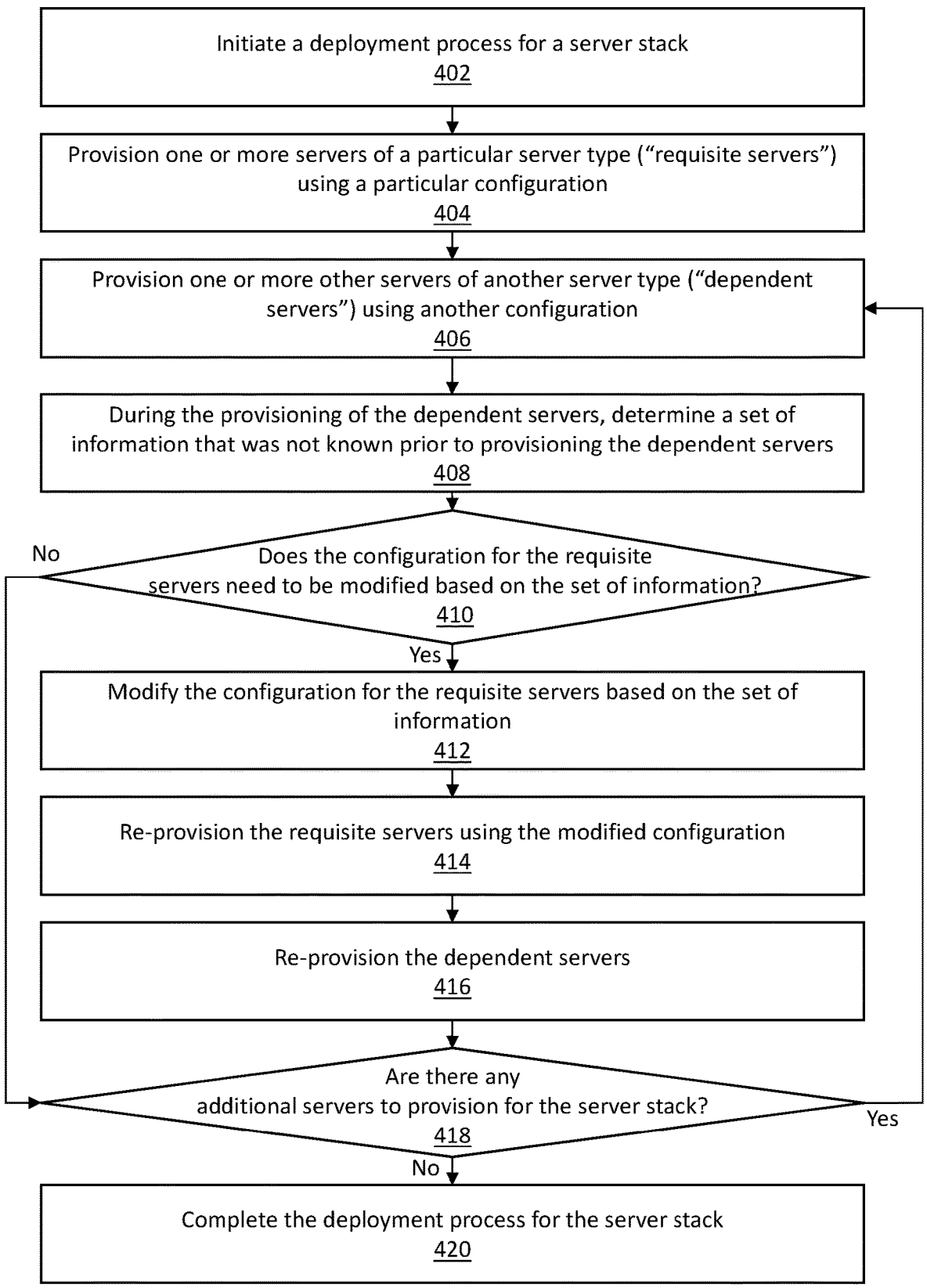
FIG. 4 illustrates an example set of operations for deploying a server stack associated with a mutual cross-server dependency, in accordance with one or more embodiments.

5. Deploying a Server Stack Associated with a Mutual Cross-Server Dependency FIG. 4 illustrates an example set of operations for deploying a server stack associated with a mutual cross-server dependency, in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments.

One or more embodiments include initiating a deployment process for a server stack (Operation 402). Examples of operations for initiating a deployment process for a server stack are described above with reference to Operation 202.

One or more embodiments include provisioning one or more servers of a particular server type using a particular configuration (Operation 404). In an embodiment, the server stack being deployed implements a multi-tier architecture of servers. The servers of the particular server type, being provisioned at Operation 404, are associated with a lower tier than the servers of another server type, to be provisioned at Operation 406. Additionally or alternatively, the servers provisioned at Operation 406 may directly or indirectly invoke a service executed by the servers provisioned at Operation 404. Hence, the servers provisioned at Operation 404 may be referred to as "requisite servers," while the servers provisioned at Operation 406 may be referred to as "dependent servers."

Examples of operations for provisioning servers using a configuration are described above with reference to Operation 204.

One or more embodiments include provisioning one or more other servers of another server type using another configuration (Operation 406). As described above, the servers provisioned at Operation 406 may be referred to as "dependent servers." Examples of operations for provisioning servers using a configuration are described above with reference to Operation 204.

One or more embodiments include determining a set of information that was not known prior to provisioning the dependent servers (Operation 408). The server stack deployment engine 108 determines the set of information as part of the provisioning of the dependent servers.

As an example, a deployment engine may provision a set of storage servers ("requisite servers"). The key for encrypting data of the storage servers has not yet been generated. Subsequently, the deployment engine may provision a first application server of a set of application servers ("dependent servers"). Applications executed by the first application server cannot properly function without the storage servers. Meanwhile, the first application server generates the key for encrypting data of the storage servers. In this example, the key is a piece of information that was not known prior to provisioning the first application server.

As another example, a deployment engine may provision a set of storage servers ("requisite servers"). Based on a configuration for the storage servers, the deployment engine configures the storage servers to communicate with a set of application servers via Port 80. Subsequently, the deployment engine may provision a first application server of a set of application servers ("dependent servers"). Applications executed by the first application server cannot properly function without the storage servers. A configuration for the application servers specifies that communications with the storage servers are to be transmitted via Port 80. However, during provisioning of the first application server, the deployment engine may determine that Port 80 is already being used for another function. The deployment engine configures the first application server to use Port 81, rather than Port 80, for communications with the storage servers. In this example, using Port 81 for communications with the storage servers is a piece of information that was not known prior to provisioning the first application server.

One or more embodiments include determining whether the configuration for the requisite servers need to be modified based on the set of information determined at Operation 408 (Operation 410). The server stack deployment engine 108 determines whether a mutual cross-server dependency exists between the requisite servers and the dependent servers. If there is a mutual cross-server dependency, then the configuration for the requisite servers may need to be modified.

As an example, a deployment engine may provision a set of storage servers ("requisite servers"). Subsequently, the deployment engine may provision a first application server of a set of application servers ("dependent servers"). Applications executed by the first application server cannot properly function without the storage servers. Meanwhile, the first application server may generate a key for encrypting data of the storage servers. Hence, a mutual cross-server dependency exists.

The deployment engine may determine that the data of the storage servers has not yet been encrypted. Hence, the deployment engine may determine that a configuration for the storage servers needs to be modified to include the key generated by the first application server.

Additionally or alternatively, since the key for encrypting the data of the storage servers is generated by one of the application servers, the deployment engine may determine that the configuration of the storage servers needs to be modified after provisioning of the first application server. The configuration of the storage servers needs to be modified to include the key generated by the first application server. The configuration of the storage servers do not need to be modified after provisioning of the remaining application servers.

As another example, a deployment engine may provision a set of storage servers ("requisite servers"). The storage servers may be configured to communicate with a set of application servers via Port 80. Subsequently, the deployment engine may provision the set of application servers ("dependent servers"). A configuration for the application servers may specify that Port 80 is used for communicating with the storage servers. However, since Port 80 is already occupied by another function, the application servers may be configured to communicate with the storage servers via Port 81, rather than Port 80. Since the port configured for the storage servers and the port configured for the application servers must match, a mutual cross-server dependency exists.

The deployment engine may determine that there was a change to the configuration for the application servers. The configuration was changed such that Port 81, rather than Port 80, is used for communicating with the storage servers. Based on the change in the configuration for the application servers, the deployment engine may determine that a configuration for the storage servers needs to be modified. The configuration for the storage servers needs to be modified to reflect the change in the port used for communications between the storage servers and the application servers.

Additionally or alternatively, the deployment engine may compare the configuration of the storage servers and the configuration of the application servers. The deployment engine may determine that different ports, for communications between the storage servers and the application servers, are specified by the two configurations. Based on the difference, the deployment engine may determine that a configuration for the storage servers needs to be modified. The configuration for the storage servers needs to be modified to match the configuration for the application servers.

One or more embodiments include modifying the configuration for the requisite servers based on the set of information determined at Operation 408 (Operation 412). The server stack deployment engine 108 modifies the configuration for the requisite servers based on the set of information determined at Operation 408.

As described in one of the examples above, a deployment engine may modify a configuration for a set of storage servers ("requisite servers") to include a key generated by a set of application servers ("dependent servers"). The key is used to encrypt data of the storage servers.

As described in one of the examples above, a deployment engine may modify a configuration for a set of storage servers ("requisite servers") to communicate with a set of application servers ("dependent servers") using a different port. The port for communications between the storage servers and the application servers was determined during the provisioning of the application servers.

One or more embodiments include re-provisioning the requisite servers using the modified configuration (Operation 414). Examples of operations for provisioning servers using a configuration are described above with reference to Operation 204. The server stack deployment engine 108 may execute all or only a subset of the operations described at Operation 204 to re-provision the requisite servers.

One or more embodiments include re-provisioning the dependent servers (Operation 416). The server stack deployment engine 108 re-provisions the dependent servers. The server stack deployment engine 108 may use the same configuration that was previously used at Operation 406. Alternatively, the server stack deployment engine 108 may use a different configuration. Examples of operations for provisioning servers using a configuration are described above with reference to Operation 204. The server stack deployment engine 108 may execute all or only a subset of the operations described at Operation 204 to re-provision the dependent servers.

One or more embodiments include determining whether there are any additional servers to provision for the server stack (Operation 418). Examples of operations for determining whether there are any additional servers to provision for the server stack are described above with reference to Operation 218.

One or more embodiments include completing the deployment process for the server stack (Operation 420). Examples of operations for completing the deployment process for the server stack are described above with reference to Operation 220.

6. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 5A:
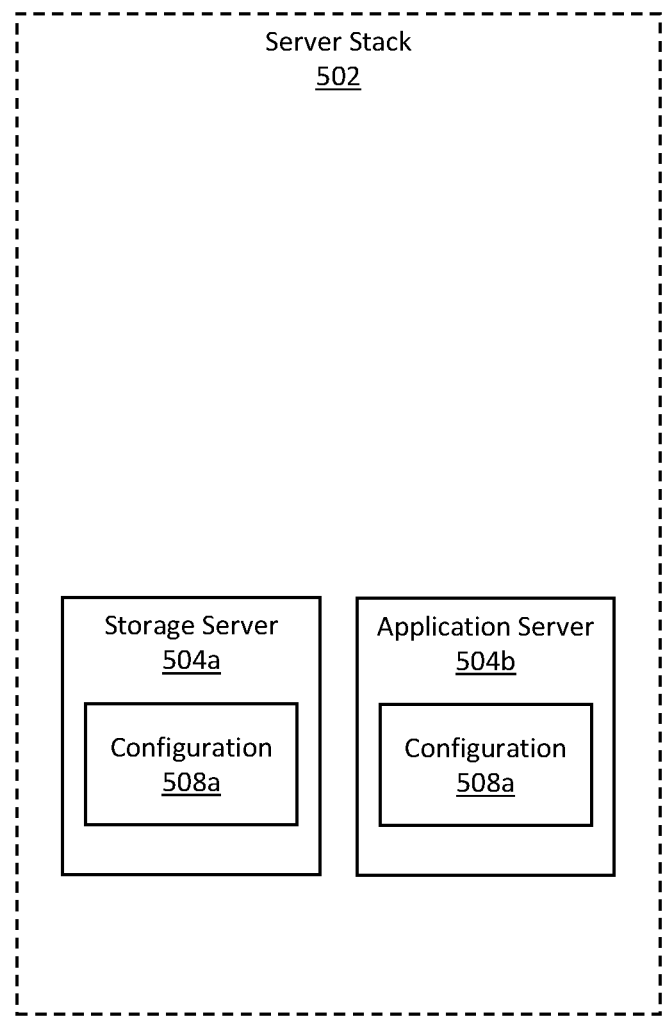
FIGS. 5A-C illustrates an example of deploying a server stack having a cross-server dependency, in accordance with one or more embodiments.
Figure 5B:
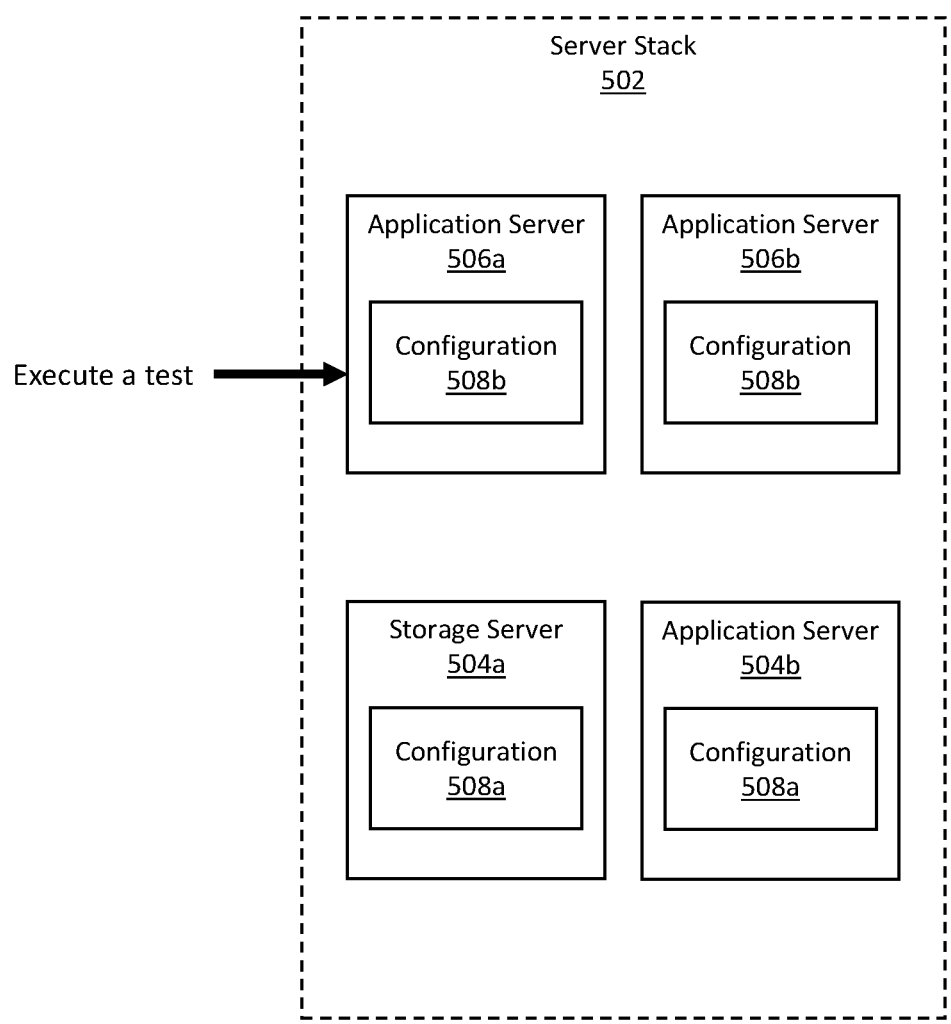
Figure 5C:
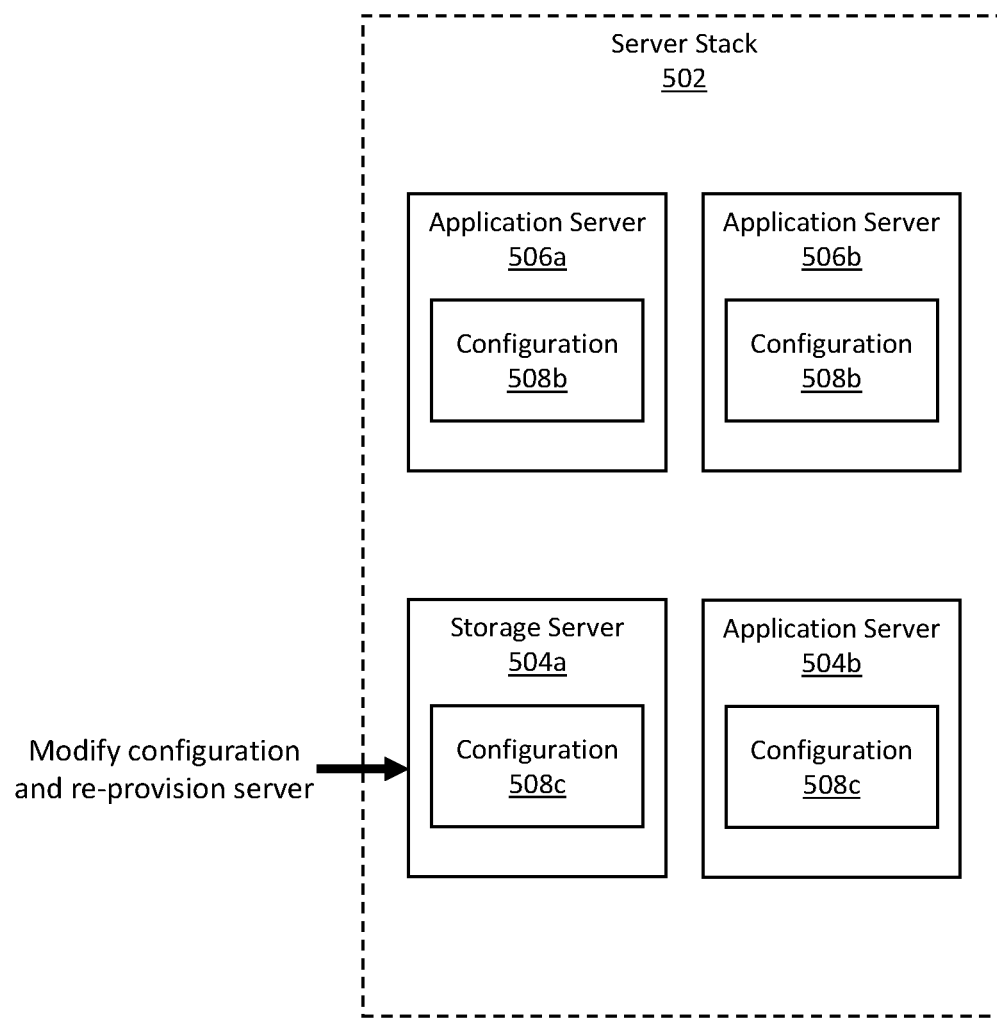

FIGS. 5A-C illustrates an example of deploying a server stack having a cross-server dependency, in accordance with one or more embodiments.

Referring to FIG. 5A, a server stack deployment engine initiates a deployment process for a server stack 502. The server stack 502 implements a multi-tier architecture of servers, including a storage tier and an application tier. The deployment engine obtains a deployment script from a user via a user interface. The deployment engine determines that the deployment script references another script for provisioning a set of storage servers, and another script for provisioning a set of application servers. The deployment engine loads the deployment script, the storage servers script, and the application servers script. The deployment engine begins executing the deployment script.

Based on a reference from the deployment script to the storage servers script, the deployment engine executes the storage servers script. The deployment engine provisions a set of storage servers 504a-b. The storage servers 504a-b are associated with the lowest tier of the multi-tier architecture. The deployment engine determines a configuration 508a, for the storage servers 504a-b, specified by the storage servers script. The configuration 508a specifies that each storage server provide ten CPUs for processing requests from any application servers.

The deployment engine installs an image onto each storage server. The deployment engine configures each storage server with ten CPUs for processing requests from any application servers. The deployment engine configures other resources for each storage server, such as a disk memory size, and a number of connections.

Referring to FIG. 5B, based on a reference from the deployment script to the application servers script, the deployment engine executes the application servers script. The deployment engine attempts to provision a set of application servers 506a-b. The application servers 506a-b are in a higher tier than the storage servers 504a-b. The deployment engine determines a configuration 508b, for the application servers 506a-b, specified by the application servers script. The configuration 508b specifies that the application servers 506a-b are to transmit requests for adding new records into the database to the storage servers 504a-b.

The deployment engine installs an image onto each application server. The deployment engine configures each application server to transmit requests for adding new records into the database to the storage servers 504a-b. The deployment engine configures other resources for each application server, such as a disk memory size, a number of connections, and a number of CPUs.

The deployment engine determines that the application servers script includes a stress test for the application servers 506a-b. The test requires that the application servers 506a-b generate multiple requests for adding new records into the database. One-hundred requests are to be transmitted to the storage severs 504a-b within two minutes.

The deployment engine executes the stress test on the application servers 506a-b. The application servers 506a-b generate requests for adding new records into the database. The application servers 506a-b transmit the requests towards the storage servers 504a-b, at a rate of fifty requests per minute. The requests are placed in a queue. The storage servers 504a-b process the requests from the queue. The queue becomes full. The application servers 506a-b continue to place requests onto the queue. A "queue overflow" error message is generated.

The deployment engine determines that the "queue overflow" error message was generated. The deployment engine performs a lookup of a set of mappings between (a) one or more behaviors of the application servers 506a-b, the storage servers 504a-b, and/or the network connecting the application servers 506a-b and the storage servers 504a-b, and (b) one or more operational requirements of the application servers 506a-b that have not been satisfied based on the corresponding behaviors. The deployment engine determines that the "queue overflow" error corresponds to the storage servers 504a-b having an insufficient number of CPUs to satisfy an operational requirement of the application servers 506a-b. The deployment engine determines that the current number of CPUs (ten CPUs) provided by the storage servers 504a-b is to service the requests from the application servers 506a-b is insufficient.

Referring to FIG. 5C, the deployment engine modifies the configuration 508a for the storage servers 504a-b. The deployment engine increases the number of CPUs provided by the storage servers 504a-b by two CPUs. The modified configuration 508c specifies that each storage server provide twelve CPUs for processing requests from any application servers.

The deployment engine re-provisions the storage servers 504a-b using the modified configuration 508c. An image was previously installed on each storage server, and there is no need to re-install the image. The deployment engine configures each storage server with twelve CPUs for processing requests from any application servers and completes re-provisioning the storage servers 504a-b.

The deployment engine attempts again to provision the application servers 506a-b using the configuration 508b. The deployment engine executes the stress test on the application servers 506a-b. The deployment engine determines that no errors are generated during execution of the stress test.

The deployment engine determines that there are no additional servers to provision for the server stack 502. The deployment engine completes the deployment process for the server stack. The entire deployment process for the entire server stack 502 was completed based on a single deployment script. The storage servers script and the application servers script were used based on references from the deployment script. The deployment script provides instructions for modifying configurations of servers based on cross-server dependencies. The deployment script provides instructions for re-provisioning of servers using a modified configuration.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
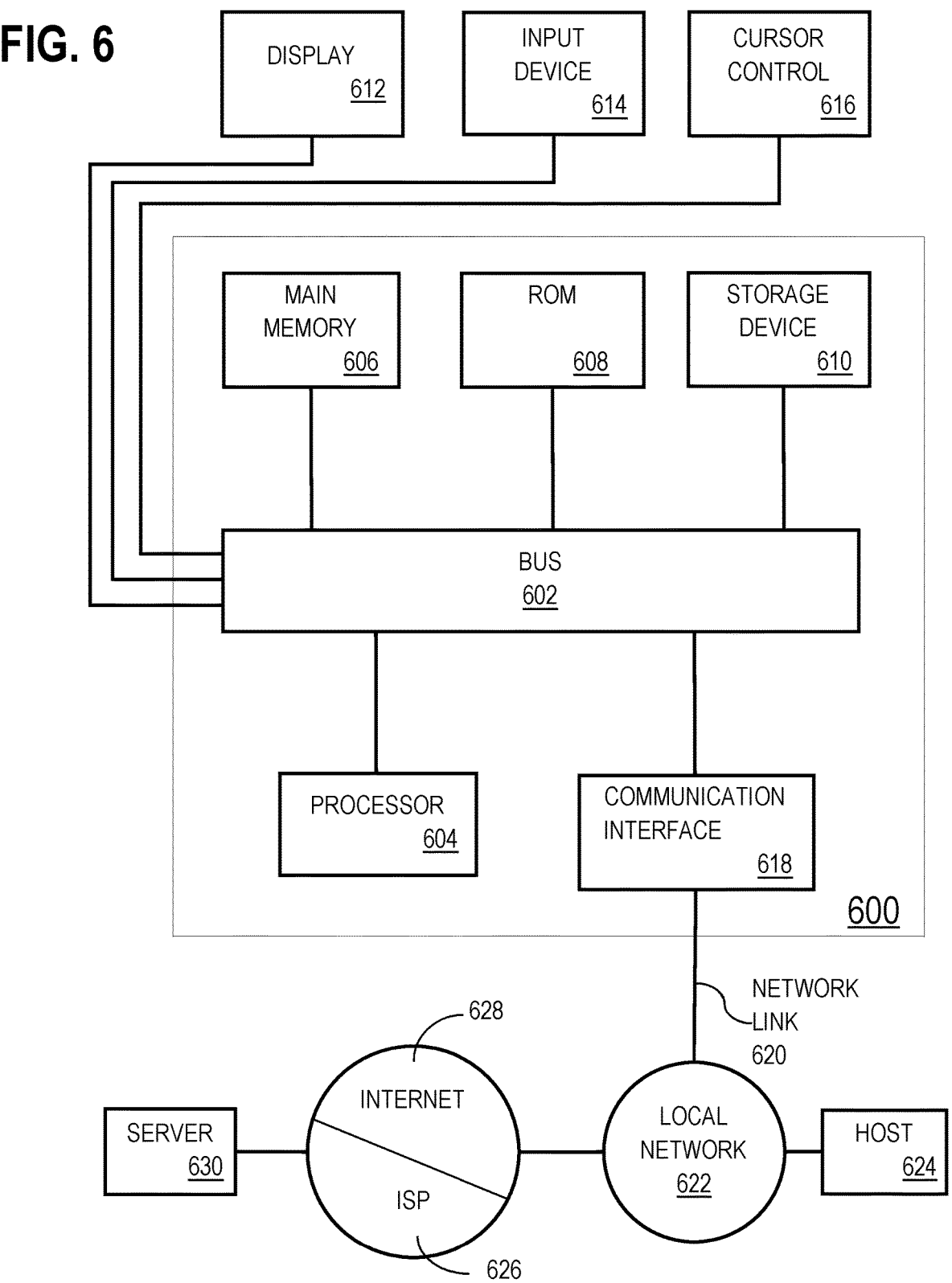
FIG. 6 shows a block diagram that illustrates a computer system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
    obtaining a request to add a first server of a first server type to a deployed server stack;
    prior to adding the first server to the deployed server stack:
        determining that the deployed server stack includes a first set of one or more servers of the first server type, wherein the first set of one or more servers is associated with a first configuration;
        determining that the first set of one or more servers includes functionality that directly or indirectly invokes a first service executed by a second set of one or more servers of a second server type in the deployed server stack, wherein the second set of one or more servers is associated with a second configuration;
        responsive to determining (a) the first server to be added is of the first server type, and (b) the first set of one or more servers of the first server type includes functionality that directly or indirectly invokes the first service executed by the second set of one or more servers of the second server type:
            determining a modified second configuration for the second set of one or more servers for addition of the first server; and
            re-provisioning the second set of one or more servers using the modified second configuration; and
        subsequent to re-provisioning the second set of one or more servers using the modified second configuration: provisioning the first server.

2. The one or more media of claim 1, further storing instructions which, when executed by the one or more processors, cause:
    determining a modified first configuration for the first set of one or more servers for addition of the first server;
    subsequent to re-provisioning the second set of one or more servers using the modified second configuration: re-provisioning the first set of one or more servers using the modified first configuration.

3. The one or more media of claim 1, further storing instructions which, when executed by the one or more processors, cause:
    determining that a third set of one or more servers of a third server type, in the deployed server stack, includes functionality that directly or indirectly invokes a second service executed by the first set of one or more servers, wherein the third set of one or more servers is associated with a third configuration;
    determining a modified third configuration for the third set of one or more servers for addition of the first server;
    subsequent to provisioning the first server: re-provisioning the third set of one or more servers using the modified third configuration.

4. The one or more media of claim 1, wherein determining that the first set of one or more servers includes functionality that directly or indirectly invokes the first service executed by the second set of one or more servers is based on monitoring at least one of operations and communications of the deployed server stack.

5. The one or more media of claim 1, wherein a set of cross-server dependency information is same for the first set of one or more servers and the first server.

6. The one or more media of claim 1, wherein determining the modified second configuration for the second set of one or more servers for addition of the first server comprises:
    determining an updated number of servers of the first server type with which the second set of servers communicates after addition of the first server;
    storing the updated number of servers in the modified second configuration.

7. The one or more media of claim 1, wherein determining the modified second configuration for the second set of one or more servers for addition of the first server comprises:
    determining an updated number of servers of the first server type with which the second set of servers communicates after addition of the first server;
    based on the updated number of the servers of the first server type, determining a maximum number of connections to be established between the servers of the first type and the second set of servers;
    storing the maximum number of connections in the modified second configuration.

8. The one or more media of claim 1, wherein determining the modified second configuration for the second set of one or more servers for addition of the first server comprises:
    determining an updated number of servers of the first server type with which the second set of servers communicates after addition of the first server;
    based on the updated number of the servers of the first server type, determining a number of processors to be provided for serving requests from the servers of the first type;
    storing the number of processors in the modified second configuration.

9. The one or more media of claim 1, further storing instructions which, when executed by the one or more processors, cause:
    determining a modified first configuration for the first set of one or more servers for addition of the first server;

subsequent to re-provisioning the second set of one or more servers using the modified second configuration: re-provisioning the first set of one or more servers using the modified first configuration;

determining that a third set of one or more servers of a third server type, in the deployed server stack, includes functionality that directly or indirectly invokes a second service executed by the first set of one or more servers, wherein the third set of one or more servers is associated with a third configuration;

determining a modified third configuration for the third set of one or more servers for addition of the first server;

subsequent to provisioning the first server: re-provisioning the third set of one or more servers using the modified third configuration;

wherein determining that the first set of one or more servers includes functionality that directly or indirectly invokes the first service executed by the second set of one or more servers is based on monitoring at least one of operations and communications of the deployed server stack;

wherein a set of cross-server dependency information is same for the first set of one or more servers and the first server;

wherein determining the modified second configuration for the second set of one or more servers for addition of the first server comprises:
  determining an updated number of servers of the first server type with which the second set of servers communicates after addition of the first server;
  storing in the modified second configuration at least one of (a) the updated number of servers, (b) a maximum number of connections, between the servers of the first type and the second set of servers, determined based on the updated number of servers, and (c) a number of processors, to be provided for serving requests from the servers of the first type, determined based on the updated number of servers.

10. A method comprising:
obtaining a request to add a first server of a first server type to a deployed server stack;
prior to adding the first server to the deployed server stack:
  determining that the deployed server stack includes a first set of one or more servers of the first server type, wherein the first set of one or more servers is associated with a first configuration;
  determining that the first set of one or more servers includes functionality that directly or indirectly invokes a first service executed by a second set of one or more servers of a second server type in the deployed server stack, wherein the second set of one or more servers is associated with a second configuration;
  responsive to determining (a) the first server to be added is of the first server type, and (b) the first set of one or more servers of the first server type includes functionality that directly or indirectly invokes the first service executed by the second set of one or more servers of the second server type:
    determining a modified second configuration for the second set of one or more servers for addition of the first server; and
    re-provisioning the second set of one or more servers using the modified second configuration; and subsequent to re-provisioning the second set of one or more servers using the modified second configuration: provisioning the first server.

11. The method of claim 10, further comprising:
determining a modified first configuration for the first set of one or more servers for addition of the first server;
subsequent to re-provisioning the second set of one or more servers using the modified second configuration: re-provisioning the first set of one or more servers using the modified first configuration.

12. The method of claim 10, further comprising:
determining that a third set of one or more servers of a third server type, in the deployed server stack, includes functionality that directly or indirectly invokes a second service executed by the first set of one or more servers, wherein the third set of one or more servers is associated with a third configuration;
determining a modified third configuration for the third set of one or more servers for addition of the first server;
subsequent to provisioning the first server: re-provisioning the third set of one or more servers using the modified third configuration.

13. The method of claim 10, wherein determining that the first set of one or more servers includes functionality that directly or indirectly invokes the first service executed by the second set of one or more servers is based on monitoring at least one of operations and communications of the deployed server stack.

14. The method of claim 10, wherein a set of cross-server dependency information is same for the first set of one or more servers and the first server.

15. The method of claim 10, wherein determining the modified second configuration for the second set of one or more servers for addition of the first server comprises:
  determining an updated number of servers of the first server type with which the second set of servers communicates after addition of the first server;
  storing the updated number of servers in the modified second configuration.

16. The method of claim 10, wherein determining the modified second configuration for the second set of one or more servers for addition of the first server comprises:
  determining an updated number of servers of the first server type with which the second set of servers communicates after addition of the first server;
  based on the updated number of the servers of the first server type, determining a maximum number of connections to be established between the servers of the first type and the second set of servers;
  storing the maximum number of connections in the modified second configuration.

17. The method of claim 10, wherein determining the modified second configuration for the second set of one or more servers for addition of the first server comprises:
  determining an updated number of servers of the first server type with which the second set of servers communicates after addition of the first server;
  based on the updated number of the servers of the first server type, determining a number of processors to be provided for serving requests from the servers of the first type;
  storing the number of processors in the modified second configuration.

18. A system comprising:
one or more processors; and memory storing instructions that, when executed by the one or more processors, cause the system to perform operations comprising:

obtaining a request to add a first server of a first server type to a deployed server stack;

prior to adding the first server to the deployed server stack:

determining that the deployed server stack includes a first set of one or more servers of the first server type, wherein the first set of one or more servers is associated with a first configuration;

determining that the first set of one or more servers includes functionality that directly or indirectly invokes a first service executed by a second set of one or more servers of a second server type in the deployed server stack, wherein the second set of one or more servers is associated with a second configuration;

responsive to determining (a) the first server to be added is of the first server type, and (b) the first set of one or more servers of the first server type includes functionality that directly or indirectly invokes the first service executed by the second set of one or more servers of the second server type:

determining a modified second configuration for the second set of one or more servers for addition of the first server; and re-provisioning the second set of one or more servers using the modified second configuration; and subsequent to re-provisioning the second set of one or more servers using the modified second configuration: provisioning the first server.

19. The system of claim 18, wherein the operations further comprise:

determining a modified first configuration for the first set of one or more servers for addition of the first server;

subsequent to re-provisioning the second set of one or more servers using the modified second configuration: re-provisioning the first set of one or more servers using the modified first configuration.

20. The system of claim 18, wherein determining the modified second configuration for the second set of one or more servers for addition of the first server comprises:

determining an updated number of servers of the first server type with which the second set of servers communicates after addition of the first server;

based on the updated number of the servers of the first server type, determining a number of processors to be provided for serving requests from the servers of the first type;

storing the number of processors in the modified second configuration.

* * * * *